(12) United States Patent
Paczkowski et al.

(10) Patent No.: US 11,265,702 B1
(45) Date of Patent: Mar. 1, 2022

(54) SECURING PRIVATE WIRELESS GATEWAYS

(71) Applicant: T-MOBILE INNOVATIONS LLC, Overland Park, KS (US)

(72) Inventors: Lyle W. Paczkowski, Mission Hills, KS (US); David Hufker, Shawnee, KS (US); George Jason Schnellbacher, Overland Park, KS (US); Michael David Svoren, Jr., Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 216 days.

(21) Appl. No.: 16/581,113

(22) Filed: Sep. 24, 2019

(51) Int. Cl.
| | |
|---|---|
| *H04W 12/02* | (2009.01) |
| *H04W 12/06* | (2021.01) |
| *H04L 41/0806* | (2022.01) |
| *H04W 12/08* | (2021.01) |
| *H04W 12/041* | (2021.01) |
| *H04W 84/18* | (2009.01) |

(52) U.S. Cl.
CPC ......... *H04W 12/02* (2013.01); *H04L 41/0806* (2013.01); *H04W 12/041* (2021.01); *H04W 12/06* (2013.01); *H04W 12/08* (2013.01); *H04W 84/18* (2013.01)

(58) Field of Classification Search
CPC ... H04W 12/02; H04W 12/041; H04W 12/06; H04W 12/08; H04W 84/18; H04L 41/0806
USPC .................................................. 726/2
See application file for complete search history.

(56) References Cited

U.S. PATENT DOCUMENTS

| | | | |
|---|---|---|---|
| 9,282,898 B2 | 3/2016 | McRoberts et al. | |
| 2009/0016353 A1* | 1/2009 | Li | H04W 8/005 370/395.3 |
| 2013/0238808 A1* | 9/2013 | Hallem | H04L 63/0281 709/227 |

* cited by examiner

*Primary Examiner* — Jacob Lipman

(57) ABSTRACT

A method of a wireless private gateway securely obtaining a communication link to another wireless private gateway is provided. The method comprises transmitting a request for a first partial identifier of a relay wireless private gateway by an application executing on a first wireless private gateway to a second wireless private gateway, receiving the first partial identifier, transmitting a request for a second partial identifier of the relay wireless private gateway to a third wireless private gateway, receiving the second partial identifier, concatenating the first partial identifier and the second partial identifier to form a complete identifier of the relay wireless private gateway by the application, and transmitting a request to establish a communication link with the relay wireless private gateway by the application to the relay wireless private gateway, wherein the request to establish the communication link comprises the complete identifier of the relay wireless private gateway.

20 Claims, 5 Drawing Sheets

SECURING PRIVATE WIRELESS GATEWAYS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless private gateways may be deployed by wireless communication service providers to extend their communication networks, for example to extend data communication service coverage to the interior of buildings. As a private infrastructure, access to the wireless private gateways may be restricted by the owner of the gateways to wireless communication service subscribers in good standing (e.g., they have kept their service bill paid and up-to-date). Wireless private gateways may communicate with each other for a variety of purposes, for example to form a relay network within a building to provide a link from inside the building to a wireless radio access network (RAN) outside the building. Wireless private gateways may be added to the relay network inside a building from time-to-time, for example to provide additional areas of radio coverage and/or to support higher volumes of radio traffic.

SUMMARY

In an embodiment, a method of a wireless private gateway securely obtaining a communication link to another wireless private gateway is disclosed. The method comprises transmitting a request for a first partial identifier of a relay wireless private gateway by an application executing on a first wireless private gateway to a second wireless private gateway, receiving the first partial identifier of the relay wireless private gateway by the application, and transmitting a request for a second partial identifier of the relay wireless private gateway by the application to a third wireless private gateway. The method further comprises receiving the second partial identifier of the relay wireless private gateway by the application, concatenating the first partial identifier and the second partial identifier to form a complete identifier of the relay wireless private gateway by the application, and transmitting a request to establish a communication link with the relay wireless private gateway by the application to the relay wireless private gateway, wherein the request to establish the communication link comprises the complete identifier of the relay wireless private gateway.

In another embodiment, a wireless private gateway is disclosed. The wireless private gateway comprises a radio transceiver, a processor, a non-transitory memory, and an application stored in the non-transitory memory. When executed by the processor, the application transmits a request for a first partial identifier of a relay wireless private gateway to a second wireless private gateway via the radio transceiver, receives the first partial identifier of the relay wireless private gateway via the radio transceiver, and transmits a request for a second partial identifier of the relay wireless private gateway to a third wireless private gateway via the radio transceiver. The application further receives the second partial identifier of the relay wireless private gateway via the radio transceiver, concatenates the first partial identifier and the second partial identifier to form a complete identifier of the relay wireless private gateway, and transmits a request to establish a communication link with the relay wireless private gateway to the relay wireless private gateway via the radio transceiver, wherein the request to establish the communication link comprises the complete identifier of the relay wireless private gateway.

In yet another embodiment, a method of provisioning a wireless private gateway for participation in a mesh network of wireless private gateways is disclosed. The method comprises receiving a request from a wireless private gateway to join a mesh network of wireless private gateways by an application executing on a computer, sending a request for a public trust key to the wireless private gateway by the application, and receiving a public trust key from the wireless private gateway by the application. The method further comprises looking up an authoritative public trust key associated with the wireless private gateway in a data store by the application, comparing the authoritative public trust key to the public trust key received from the wireless private gateway, and determining that the authoritative public trust key matches the public trust key received from the wireless private gateway. The method further comprises creating a private trust key for the wireless private gateway, storing the private trust key indexed by an identity of the wireless private gateway in the data store, and sending a provisioning message to wireless private gateway by the application, where the provisioning message comprises the private trust key and provisioning information for use in communicating in the mesh network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
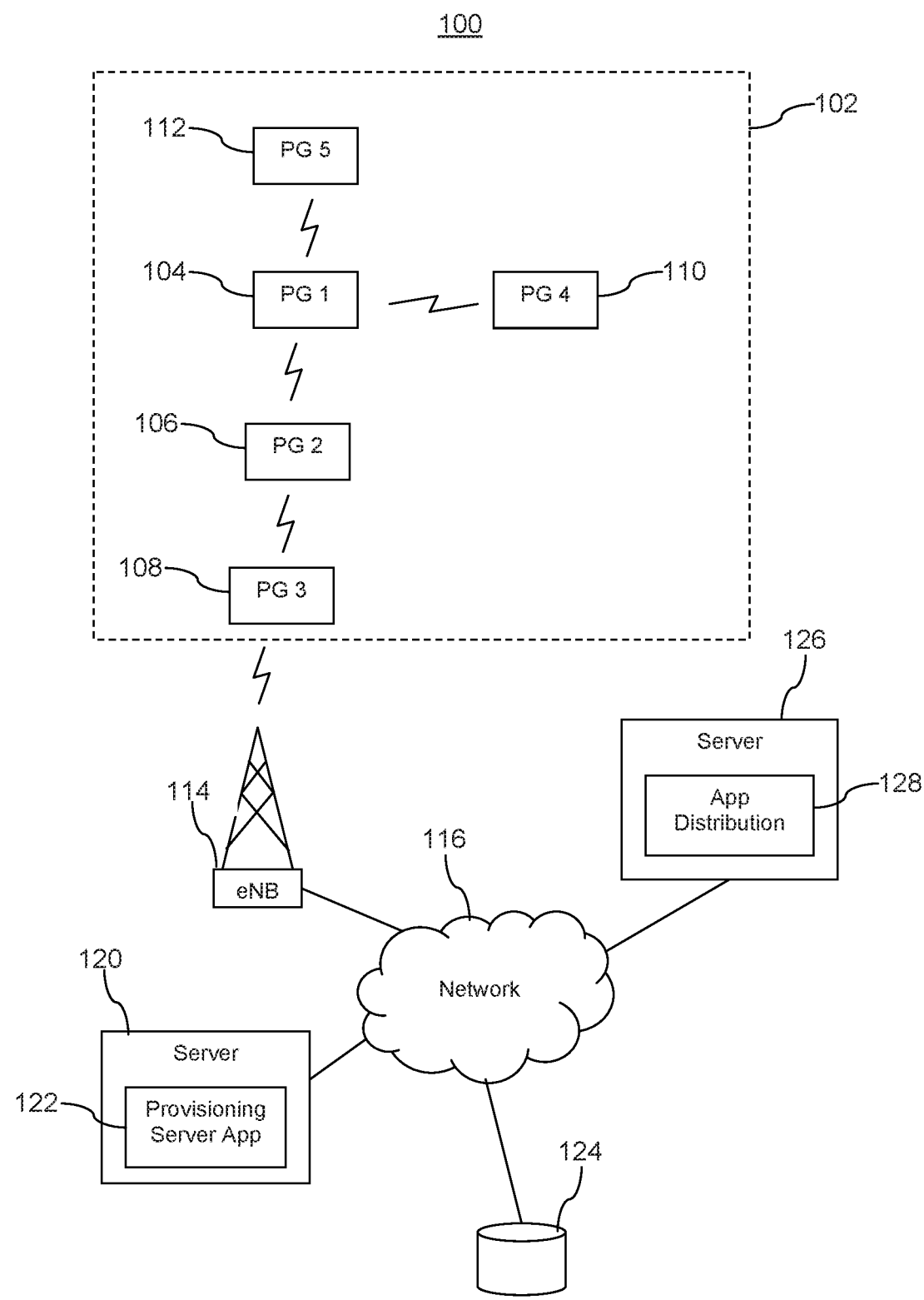
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless private gateways may establish a mesh network in which the gateways communicate with each other to support wireless communication coverage in an area such as an interior of a building. One of the services such wireless private gateways may provide are user equipment (UE) communication relay. For example, a UE located inside a building may not be in radio communication with a cell site outside the building but may communicate with the cell site via one or more intermediate wireless private gateways which relay the UE's cellular radio messages. Such wireless private gateways may be vulnerable to hacking and coopting to use as a stepping stone to get wireless communication coverage without proper authentication and/or without having an active wireless communication service subscription in good standing. The present disclosure teaches a plurality of methods that can reduce the exposure of private wireless gateways to such hacking.

In an embodiment, a private wireless gateway does not store its own name in its memory but instead stores a secure one-way hash of its clear text name. In this way, the name of the private wireless gateway cannot be learned by hacking the subject gateway because the gateway does not know its own name. A second private wireless gateway that wants to establish a wireless communication link with the first private wireless gateway would present the name of the first gateway in clear text, the first gateway would hash the clear text name to a hash value, and the first gateway would compare the hash value to its own stored hash value. If the hashes match, the second gateway is deemed to have provided the true name of the first gateway and may proceed to establish a communication link, possibly subject to additional handshaking processes.

When a new private wireless gateway attempts to enter a mesh of previously deployed private wireless gateways, the new gateway must learn the name of other wireless private gateways it may desire to communicate with. To provide increased security, the present disclosure teaches a name discovery process where neighboring private wireless gateways share a portion only of a given gateway's name with a newly deployed wireless private gateway. For example, the second private wireless gateway above may initially not know the clear text name of the first private wireless gateway. The second private wireless gateway requests a part of the name from a third private wireless gateway and another part of the name from a fourth private wireless gateway.

The third and the fourth private wireless gateway provide an application programming interface (API) that supports sharing information about the name of the first private wireless gateway (and of other gateways) but restrict the response provided to only providing half of the clear text name of the first private wireless gateway. These gateways may further subject the second private gateway to additional security checks before providing their partial name responses. In this way, the second private wireless gateway cannot hack the name of the first private wireless gateway because the gateway does not know its own clear text name, only its hashed name. The second private wireless gateway has to receive the first half of the clear text name from the third gateway and the second half of the clear text name from the fourth gateway. If either the third gateway or the fourth gateway has any reservations about sharing the portion of the clear text name with the second gateway and withholds that portion of the name, the second gateway is prevented from establishing communication with the first private wireless gateway. In effect, this enlarges the community of community of peers who are able to weigh in and block access of the second gateway if it feels something is awry. Thus, the threshold for hacking into the mesh network is raised and made more difficult. While the present disclosure describes the process of providing two halves of the clear text name from a third and a fourth gateway to the second gateway, it is understood that the clear text name in other embodiments may be fractioned into three different portions, four different portions, or some higher number of portions, increasing yet further the community of peers which the new gateway is scrutinized by.

Once a newly initiated wireless private gateway has learned the complete clear text name of a peer wireless private gateway, it stores that complete clear text name and uses it to communicate with the subject peer wireless private gateway. When another wireless private gateway requests a clear text name of another gateway, this initialized wireless private gateway will provide only a portion of that clear text name. At least part of the increased security this mechanism provides may stem from the increased complexity of the two-step process of obtaining parts of the name and then concatenating the parts to form the complete clear text name.

In an embodiment, a wireless private gateway may have a trusted execution environment (TEE) which is configured with a public trust key. When the wireless private gateway is initialized and communicates back to a provisioning server in a core network of a wireless communication service provider it requests to be provisioned. The provisioning server requests the gateway to reply with a message comprising its public trust key. The gateway looks up the public trust key stored in its TEE and returns this to the provisioning server. If the public trust key supplied by the gateway matches a public trust key stored in a data store indexed by the identity of the gateway, the provisioning server deems the gateway authenticated. The provisioning server generates a private trust key for the gateway, provisions the gateway for communication service in the core network, and sends a provisioning message including provisioning information and the private trust key to the gateway. In an embodiment, the provisioning server establishes a trusted end-to-end communication channel with the gateway and sends the provisioning information and the private trust key to the gateway via the trusted channel.

At a later time, the wireless private gateway may communicate with an application server requesting to download trusted applications. The wireless private gateway may provide the private trust key or a key derived from the private trust key to the application server, and the application server may request the provisioning server to authenticate the private trust key or derived key. If the provisioning server authenticates the key, the application server may establish a trusted end-to-end communication channel to the gateway and download the trusted application to the gateway. The gateway may then execute at least part of the trusted application in its TEE.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, the system 100 comprises a first wireless private gateway 104, a second wireless private gateway 106, a third wireless private gateway 108, a fourth wireless private gateway 110, and a fifth wireless private gateway 112. Hereinafter the wireless private gateways 104-112 may sometimes be referred to succinctly as gateways. In an example, the gateways 104-112 are located within a building 102.

The third gateway 108 may be provided a wireless communication link by a cell site 114 according to one of a 5G, long-term evolution (LTE), code division multiple access (CDMA), global system for mobile communication (GSM), or other wireless communication protocol. The third gateway 108 may be located near an outer wall of the building 102. The radio signals of the cell site 114 may not penetrate into an interior of the building 102 but does provide wireless coverage to the third gateway 108. The cell site 114 may provide communications coupling from the third gateway 108 to the network 116. In turn, the third gateway 108 may provide communication coupling to the network 116 to other gateways 106, 104, 110, 112.

For example, the first gateway 104 may provide communications coupling to the fourth gateway 110 and the fifth gateway 112. The second gateway 106 may provide communications coupling to the first gateway 104. The third gateway 108 may provide communications coupling to the second gateway 106. This kind of communications coupling may be referred to as so-called "daisy chain" coupling in some contexts. In an embodiment, any of the gateways 104-112 may bridge the mesh network to the cell site 114 and therethrough communicatively couple the gateways 104-112 to the network 116.

The communications coupling between some of the gateways 104-112 may be provided by wireless communication according to a 5G, long-term evolution (LTE), code division multiple access (CDMA), global system for mobile communication (GSM), or other wireless communication protocol. The communications coupling between some of the gateways 104-112 may be provided by WiFi radio communication links. In some contexts, a gateway 108, 106, 104 that provides coupling to the cell site 114 for other gateways may be referred to as relay wireless private gateways or to serve in the role of a relay wireless private gateway. The network 116 comprises one or more public networks, one or more private networks, or a combination thereof. The system 100 may comprise any number of cell sites 114, any number of buildings 102, and any number of wireless private gateways.

Figure 2:
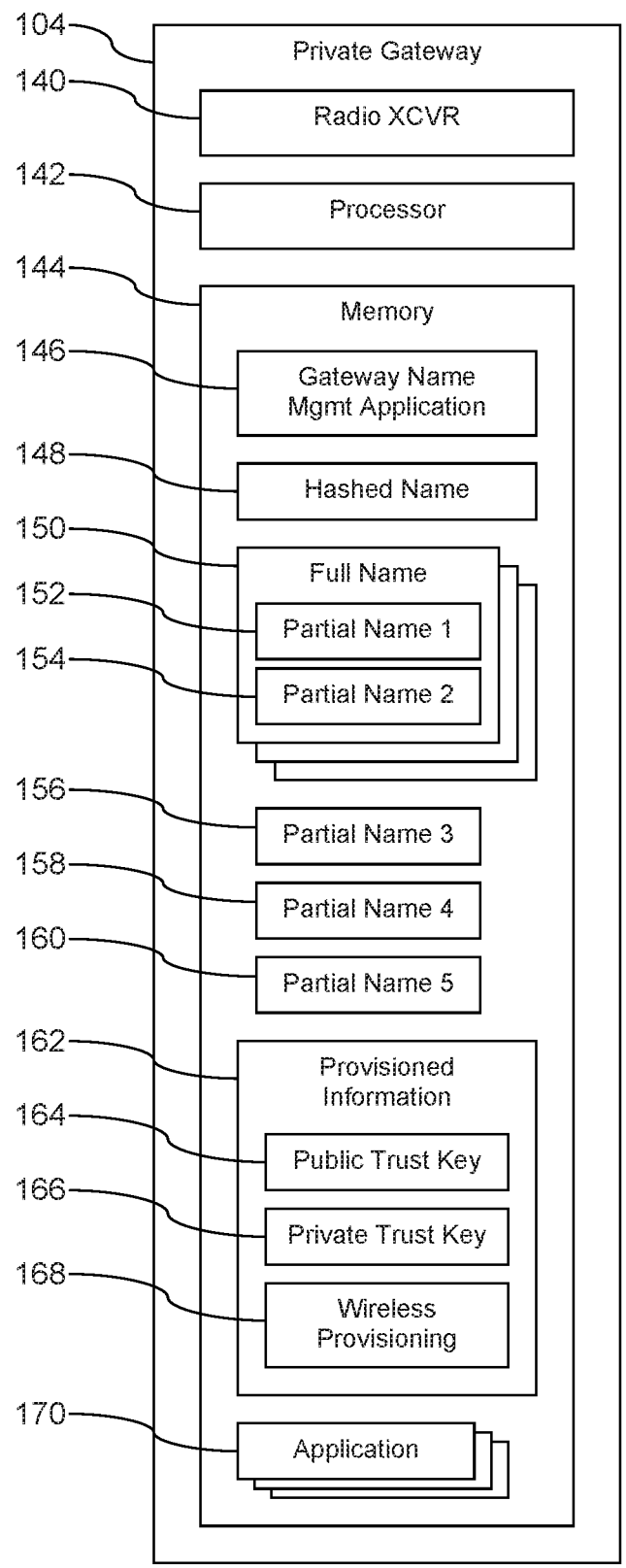
FIG. 2 is a block diagram of a wireless private gateway electronic device according to an embodiment of the disclosure.

Turning now to FIG. 2, further details of the first wireless private gateway 104 are described. In an embodiment, each of the gateways 106-112 are substantially similar to the first gateway 104. In an embodiment, the first gateway 104 comprises a radio transceiver 140, a processor 142, and a memory 144. The memory 144 may comprise a gateway name management application 146, a hashed name 148, a plurality of full names 150 each comprising a first partial name 152 and a second partial name 154. The memory 144 may further comprise a third partial name 156, a fourth partial name 158, a fifth partial name 160, provisioned information 162, and one or more applications 170. The provisioned information 162 may comprise a public trust key 164, a private trust key 166, and wireless provisioning 168. Some of the contents of memory 144 may not be present in an initial state of the first wireless private gateway 104 and may be added or configured after the gateway 104 is brought into service and activated for communication services.

In an embodiment, the private gateway 104 provides a trusted execution environment (TEE). For example, a trusted or secure portion of the processor 142 may provide trusted execution that cannot be accessed by another portion of the processor 142 that may be said to provide a rich execution environment (REE) and which is disabled while the trusted portion of the processor 142 executes. For example, a trusted or secure portion of the memory 144 may provide non-transitory storage for trusted information and for trusted applications. For example, the public trust key 164 and the private trust key 166 may be stored in the trusted portion of the memory 144. For example, some of the applications 170 may be stored in the trusted portion of the memory 144.

In an embodiment, the radio transceiver 140 provides wireless links to other gateways and/or to a cellular radio access network (RAN) (e.g., cell site 114 or other cell site) according to one or more of a 5G, long-term evolution (LTE), code division multiple access (CDMA), global system for mobile communication (GSM), or other wireless communication protocol. In an embodiment, the radio transceiver 140 may provide some wireless links to other gateways 106-112 according to a WiFi protocol.

With reference now to both FIG. 1 and FIG. 2, the first gateway 104 may be configured with the public trust key 164 when it is manufactured. The first gateway 104 may be configured with the hashed name 148 when it is deployed into the system 100, for example when deployed into a mesh network of other gateways 104-112. The hashed name 148 is a hash value that is determined by performing a secure one-way hash algorithm on a clear text name assigned to the first gateway 104, for example using an MD5, SHA-1, SHA-2, SHA-3, or other secure one-way hashing algorithm. In an embodiment, the system 100 further comprises a server computer 120 that executes a provisioning server application 122. In an embodiment, the provisioning server application 122 determines a clear text name of the first gateway 104, calculates a secure one-way hash over the clear text name, and propagates the hash value to the first gateway 104 for storage in the hashed name 148. The provisioning server application 122 may further promulgate the clear text name of the first gateway 104 to other gateways 106, 108, 110, 112 that have previously been deployed into the mesh network.

The other gateways 106, 108, 110, 112 may store the clear text name of the first gateway 104 in a full name 150 in their memory 144, where a first half of the clear text name is provided in the first partial name 152 and a second half of the clear text name is provided in the second partial name 154. When a gateway 104-112 is queried by another gateway, for example a gateway that has been newly added to the mesh network, the queried gateway provides only one of the two partial names 152, 154 associated with the subject gateway. For example, if the first gateway 104 asks the fourth gateway 110 and the fifth gateway 112 for the clear text name of the second gateway 106, the fourth gateway 110 may provide the first half of the clear text name of the second gateway 106 and the fifth gateway 112 may provide the second half of the clear text name of the second gateway 106. The first gateway 104 may then concatenate the first half name and the second half name to form the complete clear text name (e.g., full name) of the second gateway 106. Having discovered the complete clear text name of the second gateway 106 in this way, the first gateway 104 can request a communication link with the second gateway 106 in part by providing the complete clear text name of the second gateway 106.

The first gateway 104 may store the clear text name of the second gateway 106 in a full name 152 as a first partial name 154 and a second partial name 156. In the future, when the first gateway 104 wishes to reestablish a communication link with the second gateway 106, it forms the complete clear text name of the second gateway 106 by concatenating the first partial name 152 and the second partial name 154 to form the complete clear text name of the second gateway 106. In an embodiment, the full names 150 are stored in a transitory portion of memory of the gateway and when the gateway reboots or power cycles it must relearn the names of other gateways in the mesh network.

The second gateway 106 does not store its own clear text name. None of the gateways 104-112 stores its own clear text name. This teaching of the present disclosure makes it impossible for a device to gain entry into the mesh network of gateways 104-112 by hacking a gateway to learn its name. The second gateway 106 receives a clear text name from the first gateway 104, calculates a hash value on the clear text name, and compares that calculated hash value to the hashed name 148 it stores in its memory 144. If these two hash values match, the second gateway 106 deems that the first gateway 104 has presented the correct clear text name associated with the second gateway 106 and may provide the requested communication link to the first gateway 104. In an embodiment, the first gateway 104 may be required by the second gateway 106 to present additional authentication credentials before providing the requested communication link.

The provisioning server application 122 may provide the clear text name of a gateway being deployed to a mesh network to the other gateways already deployed to the mesh network. For example, when the first gateway 104 is deployed to the building 102, the provisioning server application 122 may provide the clear text name of the first gateway 104 to the gateways 106, 108, 110, 112. When a gateway 104-112 receives a request for a clear text name of another gateway, it never provides the full clear text name but only a portion, for example only a half of the clear text name. In an embodiment, clear text names may be fractioned into three parts, four parts, or some other number of parts, and a gateway wishing to learn the clear text name of a subject gateway would need to inquire to a corresponding number of other gateways to accumulate each of the parts of the full clear text name.

In an embodiment, the gateway 104-112 stores the full name 150 only while it is establishing a communication link with another gateway and then deletes the full name 150. In this way, the gateway does not store the complete clear text name of a gateway and hence cannot be hacked to reveal the full clear text name of another gateway. Thus, the gateway 104 may look up a partial name in its memory 144, request the other partial name from another gateway, concatenate the portions, send the full name to the gateway it wishes to communicate with, and delete the other partial name rather than storing in its memory 144.

The gateway 104-112 may only store partial names 152, 154, 156, 158, 160 of other gateways in a non-transitory portion of the memory 144. In this case, the gateway could be hacked to reveal a portion of a name of another gateway but not the complete name. Thus, a hacker would need to successfully hack two gateways to obtain a clear text name of a gateway, which is more difficult than hacking merely one such gateway. In an embodiment, the provisioning server application 122 manages provisioning partial names 152, 154, 156, 158, 160 to gateways 104-112 so as to promote the gateways in a mesh network being able to discover complete clear text names by querrying each other. In an embodiment, a complete clear text name of a gateway 104-112 comprises eight bytes or characters and a partial name 152-160 comprises four bytes or characters.

In an embodiment, the wireless private gateway 104 may communicate to the provisioning server application 122 to be provisioned upon being deployed to the building 102. The provisioning server application 122 sends a request to the wireless private gateway 104 to provide the public trust key 164 of the gateway 104 which may be stored in a trusted portion of the memory 144. The provisioning server application 122 may establish a trusted end-to-end communication link between the server 120 and the first private gateway 104 and send the request for the public trust key 164 via the trusted link. The gateway name management application 146, or another trusted application on the gateway 104, may execute in a TEE of the gateway 104 and return the public trust key 164 to the provisioning server application 122 executing in a TEE of the server 120. The provisioning server application 122 compares the public trust key 164 provided by the gateway 104 to an authoritative public trust key associated to the gateway 104 in a data store 124.

If the public trust key 164 provided by the gateway 104 matches the authoritative public trust key looked up in the data store 124 by the provisioning server application 122, the provisioning server application 122 generates a private trust key 166, looks up provisioning information 148 for the gateway 104, and sends the provisioning information 168 and private trust key 166 to the gateway 104 and/or the gateway name management application 146 via the trusted link. The gateway name management application 146 stores the provisioning information 168 received from the provisioning server application 122 in the wireless provisioning 168 and stores the private trust key as the private trust key 166 in a trusted portion of the memory 144. The wireless provisioning information may comprise cellular radio access network (RAN) credentials for authenticating into the RAN.

The gateway 104 may desire to download and install trusted applications 170 from an application server 126 executing an application distribution program 128. The gateway name management application 146 may send a request for an application download along with its trusted private key 166 or a key derived from its trusted private key (e.g., a one-time use derived key) to the application distribution program 128. The application distribution program 128 may request the provisioning server application 122 to validate the trusted private key 166 or derived key. If the provisioning server application 122 validates the key, the application distribution program 128 may establish a trusted end-to-end communication link to the gateway 104 and transmit one or more trusted applications 170 to the gateway 104 via the trusted link. The trusted applications 170 may be applications that support sensitive operations in the mesh network, for example financial transactions or preferred roaming lists (PRLs) for relaying user equipment (UE) or mobile phone cellular calls to the cell site 114.

Figure 3:
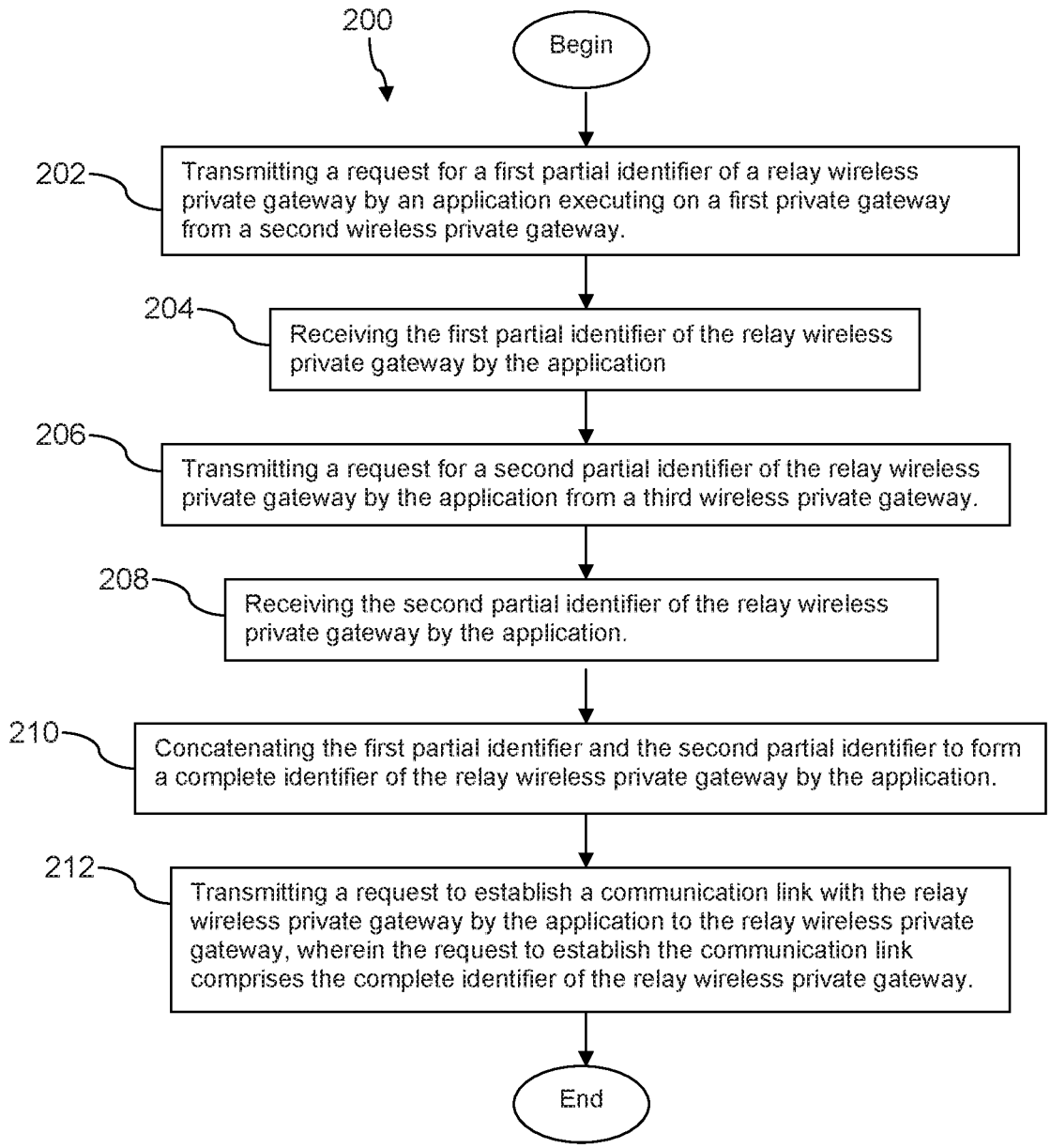
FIG. 3 is a flow chart of a method according to an embodiment of the disclosure.

Turning now to FIG. 3, a method 200 is described. In an embodiment, method 200 is a method of a wireless private gateway securely obtaining a communication link to another wireless private gateway. At block 202, the method 200 comprises transmitting a request for a first partial identifier of a relay wireless private gateway by an application executing on a first wireless private gateway to a second wireless private gateway. At block 204, the method 200 comprises receiving the first partial identifier of the relay wireless private gateway by the application.

At block 206, the method 200 comprises transmitting a request for a second partial identifier of the relay wireless private gateway by the application to a third wireless private gateway. At block 208, the method 200 comprises receiving the second partial identifier of the relay wireless private gateway by the application.

At block 210, the method 200 comprises concatenating the first partial identifier and the second partial identifier to form a complete identifier of the relay wireless private gateway by the application. At block 212, the method 200 comprises transmitting a request to establish a communication link with the relay wireless private gateway by the application to the relay wireless private gateway, wherein the request to establish the communication link comprises the complete identifier of the relay wireless private gateway.

In an embodiment, method 200 may further comprise receiving a request to establish a communication link with a fourth wireless private gateway by the application, wherein the request comprises a complete identifier of the first wireless private gateway and calculating a hash value by the application by executing a one-way secure hash algorithm on the complete identifier of the first wireless private gateway received in the request. In an embodiment, the method 200 may further comprise comparing the calculated hash value to a hash value stored in a non-transitory memory of the first wireless private gateway by the application, determining by the application that the calculated hash value matches the hash value stored in the non-transitory memory of the first wireless private gateway, and providing a wireless communication link to the fourth wireless private gateway by the first wireless private gateway. In an embodiment, the method 200 may further comprise deleting the complete identifier of the first wireless private gateway by the application after calculating the hash value.

Figure 4:
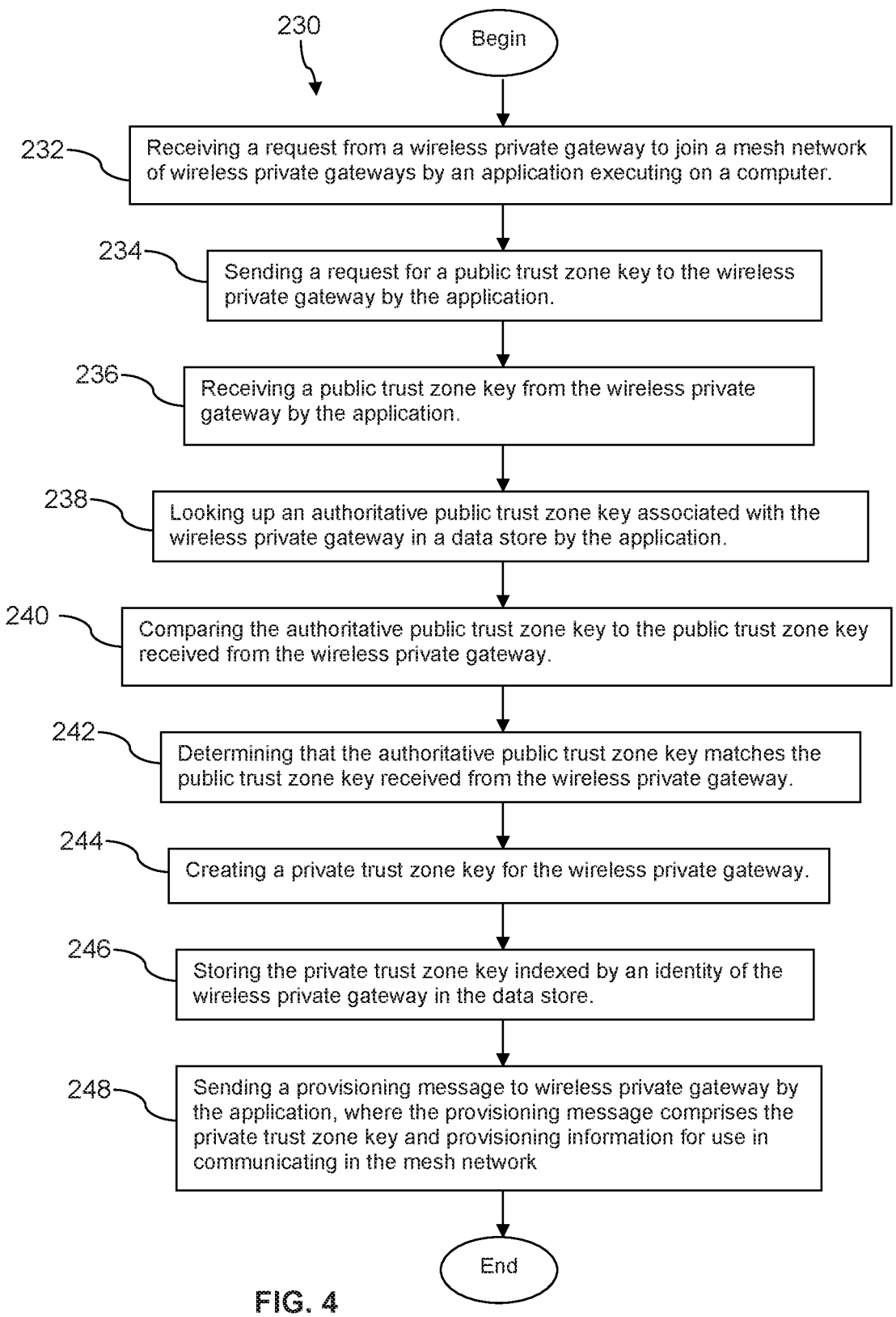
FIG. 4 is a flow chart of another method according to an embodiment of the disclosure.

Turning now to FIG. 4, a method 230 is described. In an embodiment, the method 230 is a method of provisioning a wireless private gateway for participation in a mesh network of wireless private gateways. At block 232, the method 230 comprises receiving a request from a wireless private gateway to join a mesh network of wireless private gateways by an application executing on a computer. At block 234, the method 230 comprises sending a request for a public trust key to the wireless private gateway by the application.

At block 236, the method 230 comprises receiving a public trust key from the wireless private gateway by the application. At block 238, the method 230 comprises looking up an authoritative public trust key associated with the wireless private gateway in a data store by the application.

At block 240, the method 230 comprises comparing the authoritative public trust key to the public trust key received from the wireless private gateway. At block 242, the method 230 comprises determining that the authoritative public trust key matches the public trust key received from the wireless private gateway.

At block 244, the method 230 comprises creating a private trust key for the wireless private gateway. At block 246, the method 230 comprises storing the private trust key indexed by an identity of the wireless private gateway in the data store. At block 248, the method 230 comprises sending a provisioning message to the wireless private gateway by the application, where the provisioning message comprises the private trust key and provisioning information for use in communicating in the mesh network.

In an embodiment, the method 230 further comprises receiving a request from an application distribution program to authenticate a wireless private gateway, wherein the request comprises a private trust key and an identity of the wireless private gateway and looking up an authoritative private trust key in the data store by the application based on the identity of the wireless private gateway. In an embodiment, the method 230 further comprises determining that the received private trust key is consistent with the authoritative private trust key and sending a response indicating the private trust key is authentic to the application distribution program. In an embodiment, the private trust key provided in the request received from the application distribution program is a derived private trust key, and the method 230 further comprises processing the authoritative private trust key by the application to generate an authoritative derived private trust key, wherein determining that the received private trust key is consistent with the authoritative private trust key comprises determining that the received private trust key matches the authoritative derived private trust key.

Figure 5:
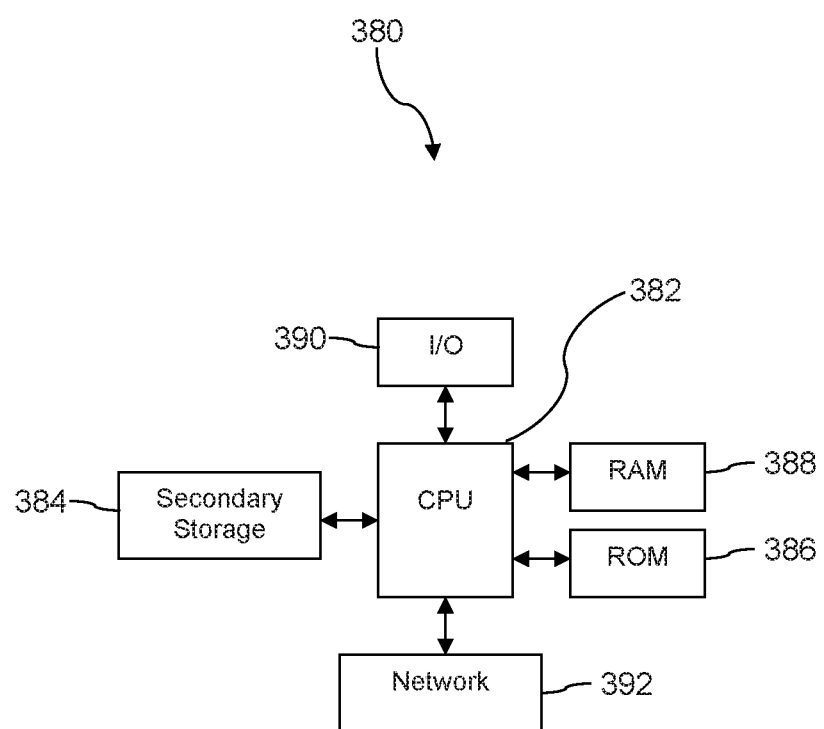
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as 5G, code division multiple access (CDMA), global system for mobile communications (GSM), long-term evolution (LTE), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of a wireless private gateway securely obtaining a communication link to another wireless private gateway, comprising:
    transmitting a request for a first partial identifier of a relay wireless private gateway by an application executing on a first wireless private gateway to a second wireless private gateway;
    receiving the first partial identifier of the relay wireless private gateway by the application;
    transmitting a request for a second partial identifier of the relay wireless private gateway by the application to a third wireless private gateway;
    receiving the second partial identifier of the relay wireless private gateway by the application;
    concatenating the first partial identifier and the second partial identifier to form a complete identifier of the relay wireless private gateway by the application; and
    transmitting a request to establish a communication link with the relay wireless private gateway by the application to the relay wireless private gateway, wherein the request to establish the communication link comprises the complete identifier of the relay wireless private gateway.

2. The method of claim 1, wherein the complete identifier of the relay wireless private gateway is eight bytes long, the first partial identifier is four bytes long, and the second partial identifier is four bytes long.

3. The method of claim 1, wherein the method further comprises storing one of the first and second partial identifiers of the relay wireless private gateway in a non-transitory memory of the first wireless private gateway and not storing the other of the first and second partial identifiers of the relay wireless private gateway in the non-transitory memory of the first wireless private gateway, whereby to avoid revealing the complete identifier of the relay wireless private gateway if the first wireless private gateway is hacked.

4. The method of claim 1, wherein the relay wireless private gateway, the first wireless private gateway, the second wireless private gateway, and the third wireless private gateway are located in a same building, and wherein the relay wireless private gateway is located near an outside wall of the building.

5. The method of claim 1, wherein the first wireless private gateway comprises a non-transitory memory that includes a trusted memory portion, and wherein the trusted memory portion stores a public key associated with the first wireless private gateway.

6. The method of claim 1, wherein none of the first wireless private gateway, the second wireless private gateway, the third wireless private gateway, and the relay wireless private gateway store their own clear text name.

7. The method of claim 1, wherein the first wireless private gateway is configured to provide a wireless communication link to a mobile communication device according to a 5G, long term evolution (LTE), a code division multiple access (CDMA), or a global system for mobile communication (GSM) telecommunication protocol.

8. The method of claim 7, wherein the first wireless private gateway is further configured to link the mobile communication device to a cellular radio access network (RAN) via the intermediately of the relay wireless private gateway.

9. The method of claim 1, further comprising:
    receiving a request to establish a communication link with a fourth wireless private gateway by the application, wherein the request comprises a complete identifier of the first wireless private gateway;
    calculating a hash value by the application by executing a one-way secure hash algorithm on the complete identifier of the first wireless private gateway received in the request;
    comparing the calculated hash value to a hash value stored in a non-transitory memory of the first wireless private gateway by the application;

determining by the application that the calculated hash value matches the hash value stored in the non-transitory memory of the first wireless private gateway; and providing a wireless communication link to the fourth wireless private gateway by the first wireless private gateway.

10. The method of claim 9, further comprising deleting the complete identifier of the first wireless private gateway by the application after calculating the hash value.

11. A wireless private gateway, comprising:
a radio transceiver;
a processor;
a non-transitory memory; and
an application stored in the non-transitory memory that, when executed by the processor:
transmits a request for a first partial identifier of a relay wireless private gateway to a second wireless private gateway via the radio transceiver,
receives the first partial identifier of the relay wireless private gateway via the radio transceiver,
transmits a request for a second partial identifier of the relay wireless private gateway to a third wireless private gateway via the radio transceiver,
receives the second partial identifier of the relay wireless private gateway via the radio transceiver,
concatenates the first partial identifier and the second partial identifier to form a complete identifier of the relay wireless private gateway, and
transmits a request to establish a communication link with the relay wireless private gateway to the relay wireless private gateway via the radio transceiver, wherein the request to establish the communication link comprises the complete identifier of the relay wireless private gateway.

12. The wireless private gateway of claim 11, wherein the application further stores one of the first and second partial identifiers of the relay wireless private gateway in the non-transitory memory and does not store the other of the first and second partial identifiers of the relay wireless private gateway in the non-transitory memory.

13. The wireless private gateway of claim 11, wherein the processor provides a trusted execution environment and the non-transitory memory provides a trusted memory portion that stores a public trust key associated with the wireless private gateway.

14. The wireless private gateway of claim 11, wherein the complete identifier of the relay wireless private gateway is eight bytes long, the first partial identifier is four bytes long, and the second partial identifier is four bytes long.

15. The wireless private gateway of claim 11, wherein the relay wireless private gateway, the first wireless private gateway, the second wireless private gateway, and the third wireless private gateway are located in a same building.

16. The wireless private gateway of claim 11, wherein none of the wireless private gateway, the second wireless private gateway, the third wireless private gateway, and the relay wireless private gateway store their own clear text name.

17. The wireless private gateway of claim 11, wherein the radio transceiver is configured to establish a radio communication link according to at least one of a 5G, a long term evolution (LTE), a code division multiple access (CDMA), or a global system for mobile communication (GSM) telecommunication protocol.

18. The wireless private gateway of claim 17, wherein the radio transceiver is further configured to establish a WiFi radio communication link.

19. The wireless private gateway of claim 11, where the application further:
receives a request to establish a communication link with a fourth wireless private gateway via the radio transceiver, wherein the request comprises a complete identifier of the first wireless private gateway,
calculates a hash value by executing a one-way secure hash algorithm on the complete identifier of the first wireless private gateway received in the request,
compares the calculated hash value to a hash value stored in the non-transitory memory,
determines that the calculated hash value matches the hash value stored in the non-transitory memory, and
provides a wireless communication link to the fourth wireless private gateway via the radio transceiver.

20. The wireless private gateway of claim 19, wherein the application further deletes the complete identifier of the first wireless private gateway after calculating the hash value.

* * * * *